(12) United States Patent
Hall et al.

(10) Patent No.: US 10,214,248 B2
(45) Date of Patent: Feb. 26, 2019

(54) TRIPARTITE SUPPORT MECHANISM FOR FRAME-MOUNTED VEHICLE COMPONENTS

(71) Applicants: David R. Hall, Provo, UT (US);
Stephen R. Hall, Draper, UT (US);
Christopher Johnson, Provo, UT (US);
Jason Simpson, Provo, UT (US);
Jedediah Knight, Provo, UT (US);
Joseph Duncan, Provo, UT (US)

(72) Inventors: David R. Hall, Provo, UT (US);
Stephen R. Hall, Draper, UT (US);
Christopher Johnson, Provo, UT (US);
Jason Simpson, Provo, UT (US);
Jedediah Knight, Provo, UT (US);
Joseph Duncan, Provo, UT (US)

(73) Assignee: Hall Labs LLC, Provo, UT (US)

( * ) Notice: Subject to any disclaimer, the term of this patent is extended or adjusted under 35 U.S.C. 154(b) by 82 days.

(21) Appl. No.: 15/350,781

(22) Filed: Nov. 14, 2016

(65) Prior Publication Data
US 2018/0134325 A1    May 17, 2018

(51) Int. Cl.
| | |
|---|---|
| *B62D 27/02* | (2006.01) |
| *B60R 1/00* | (2006.01) |
| *B60J 1/02* | (2006.01) |
| *B60J 1/00* | (2006.01) |
| *B62D 23/00* | (2006.01) |

(52) U.S. Cl.
CPC ............. *B62D 27/02* (2013.01); *B60J 1/006* (2013.01); *B60J 1/02* (2013.01); *B60R 1/006* (2013.01); *B62D 23/00* (2013.01)

(58) Field of Classification Search
CPC .......... B62D 27/02; B62D 23/00; B60J 1/006; B60J 1/02; B60R 1/006
USPC ..... 296/84.1, 96.21, 29, 201, 146.15, 190.1, 296/78.1, 92
See application file for complete search history.

(56) References Cited

U.S. PATENT DOCUMENTS

| | | | | |
|---|---|---|---|---|
| 1,567,169 | A * | 12/1925 | Patterson ................. | B60R 1/04 296/152 |
| 2,423,623 | A * | 7/1947 | Schassberger ............ | B60J 1/04 296/92 |
| 4,007,958 | A * | 2/1977 | Peifer .................... | B60J 5/0487 15/250.001 |
| 4,818,088 | A * | 4/1989 | Sacknoff ................... | B60J 1/04 248/479 |
| 2009/0273208 | A1* | 11/2009 | Ballard .................... | B60R 1/04 296/201 |

* cited by examiner

*Primary Examiner* — Jason S Morrow
*Assistant Examiner* — E Turner Hicks

(57) ABSTRACT

A vehicle is described herein that includes a unibody vehicle frame, a vehicle body panel, and one or more monolithic tripartite support mechanisms, which mechanisms provide structural support for at least three frame-mounted vehicle components. Each support mechanism includes a windshield support arm, a side view mirror support arm, and a body panel fixing plate. The side view mirror support arm extends from the windshield support, and the body panel fixing plate extends from the windshield support arm, the side-view mirror support arm, or both. Additionally, the windshield support arm holds a windshield to the vehicle, the side view mirror support arm holds a side view mirror to the vehicle, and the fixing plate secures the body panel to the frame.

20 Claims, 12 Drawing Sheets

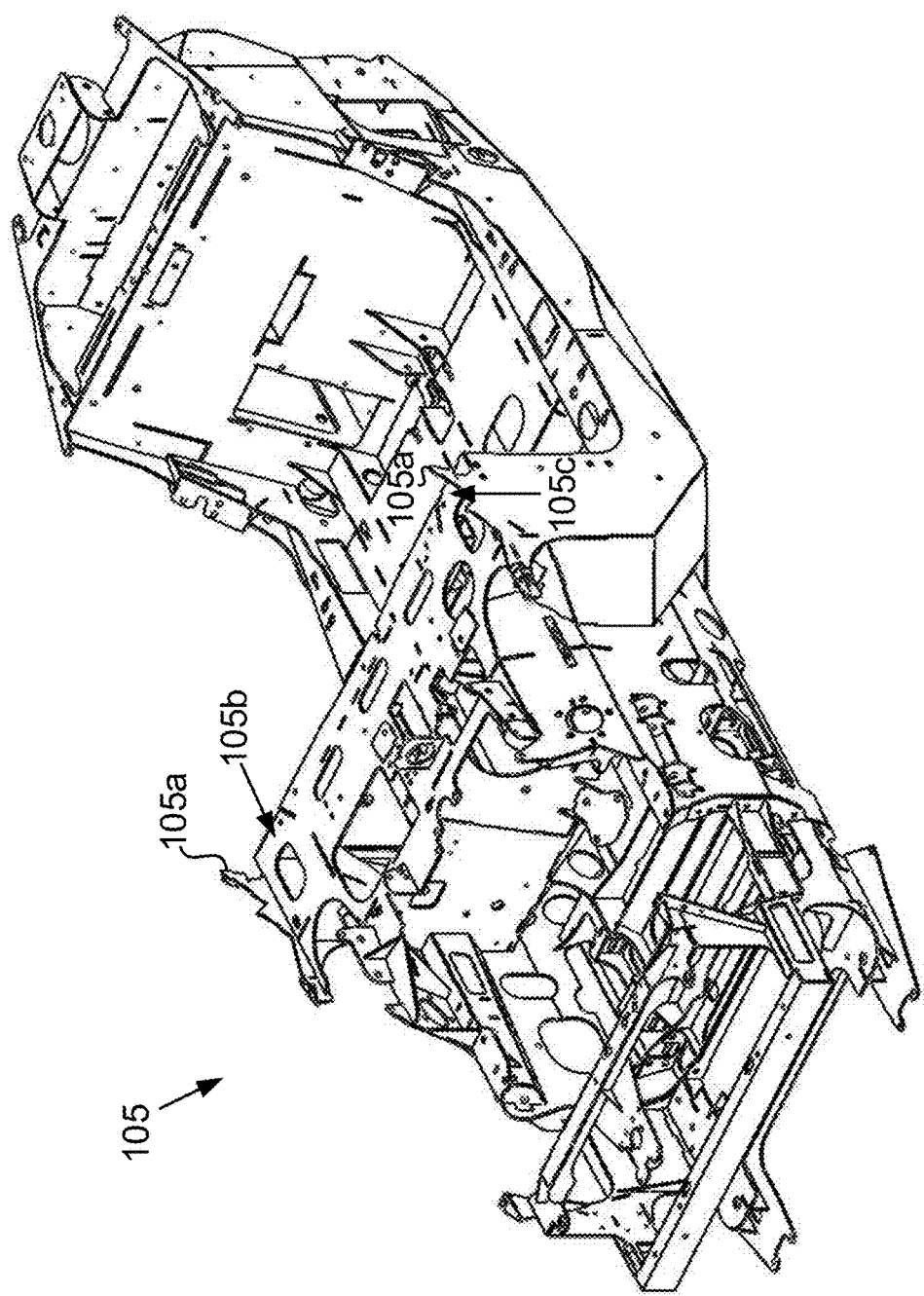

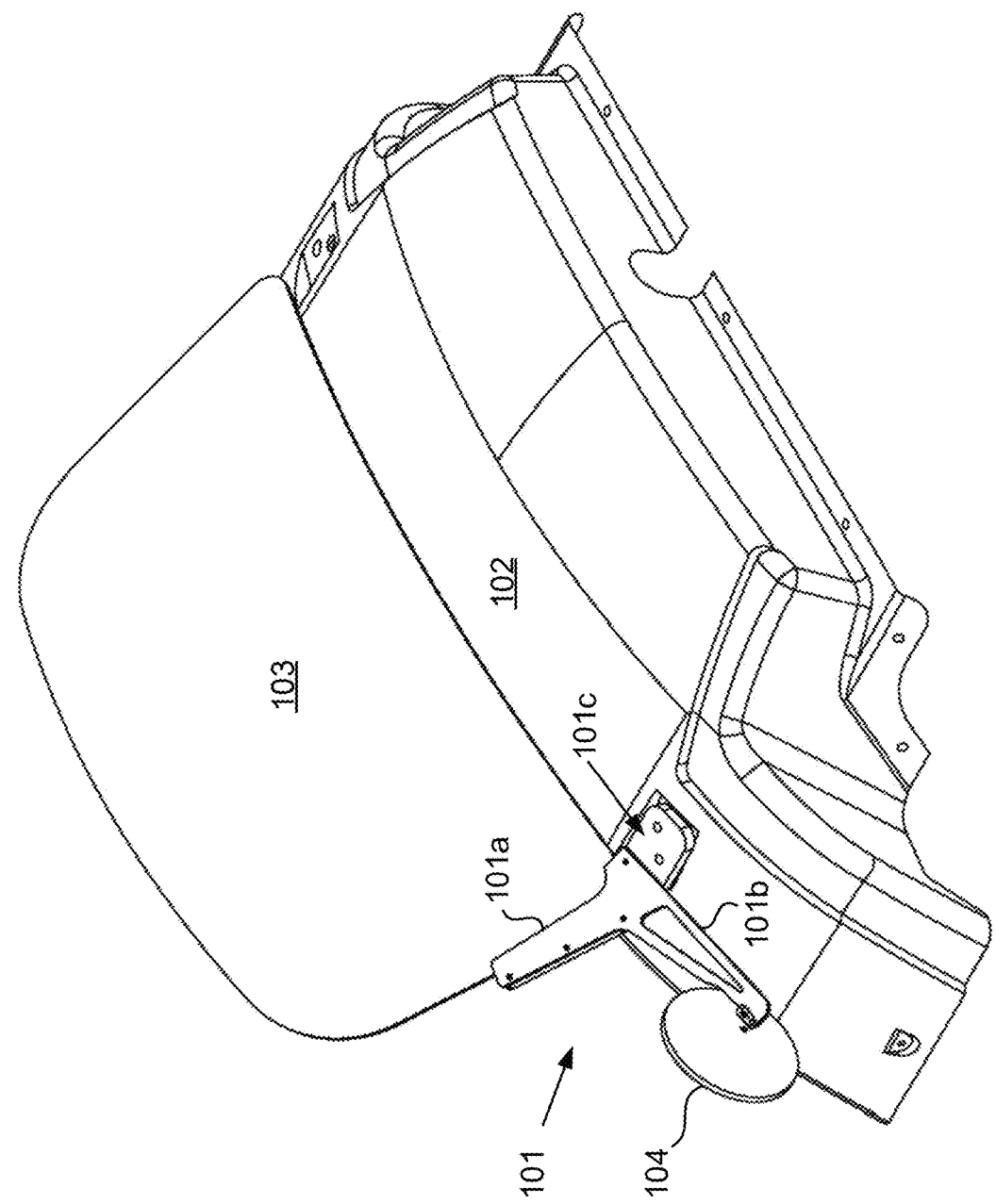

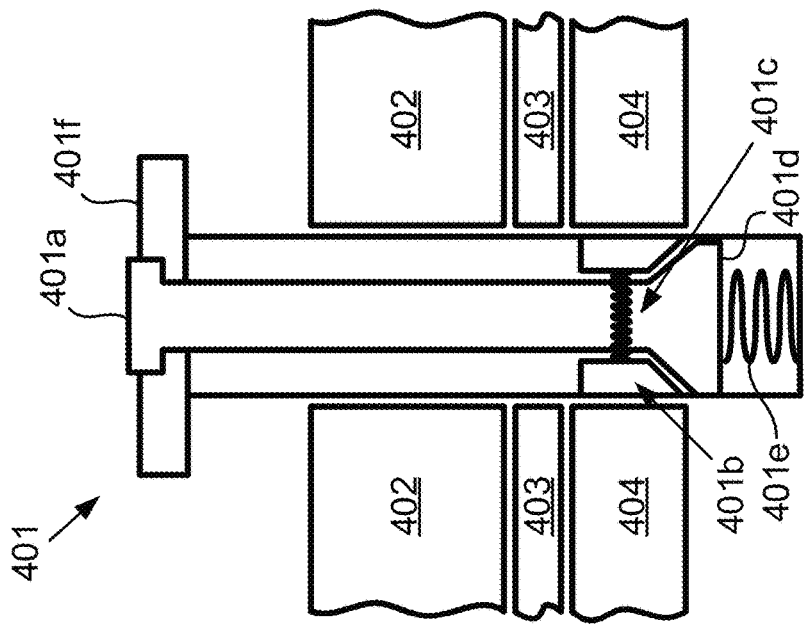
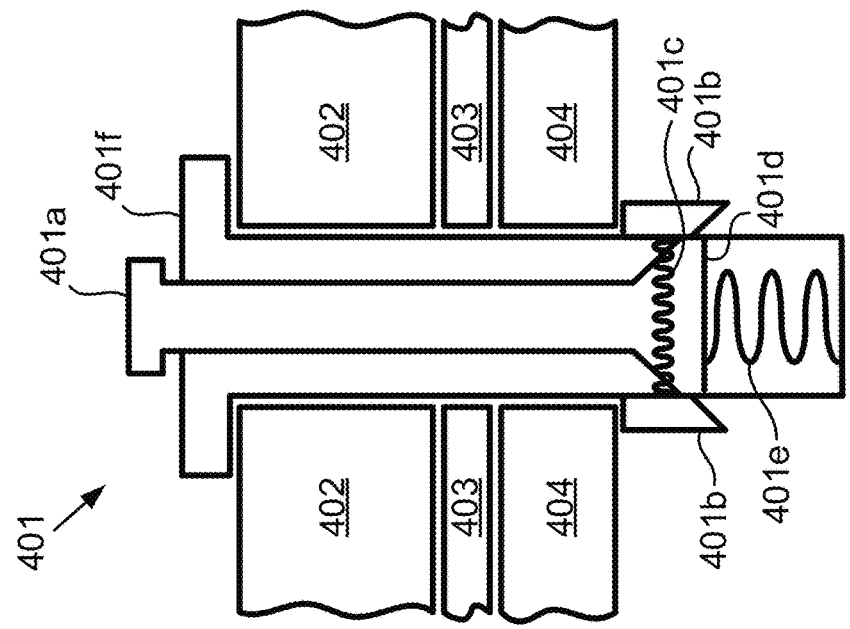

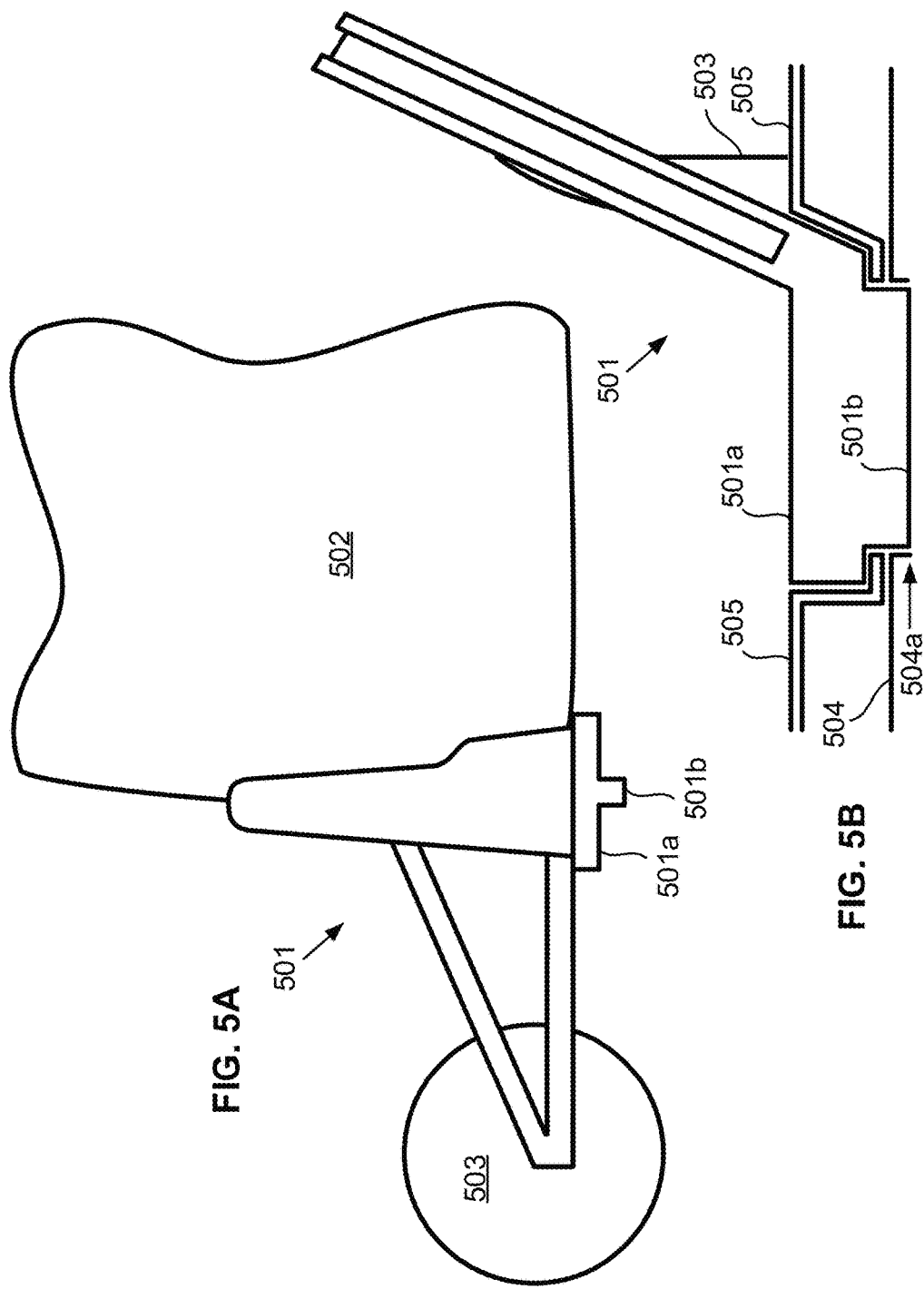

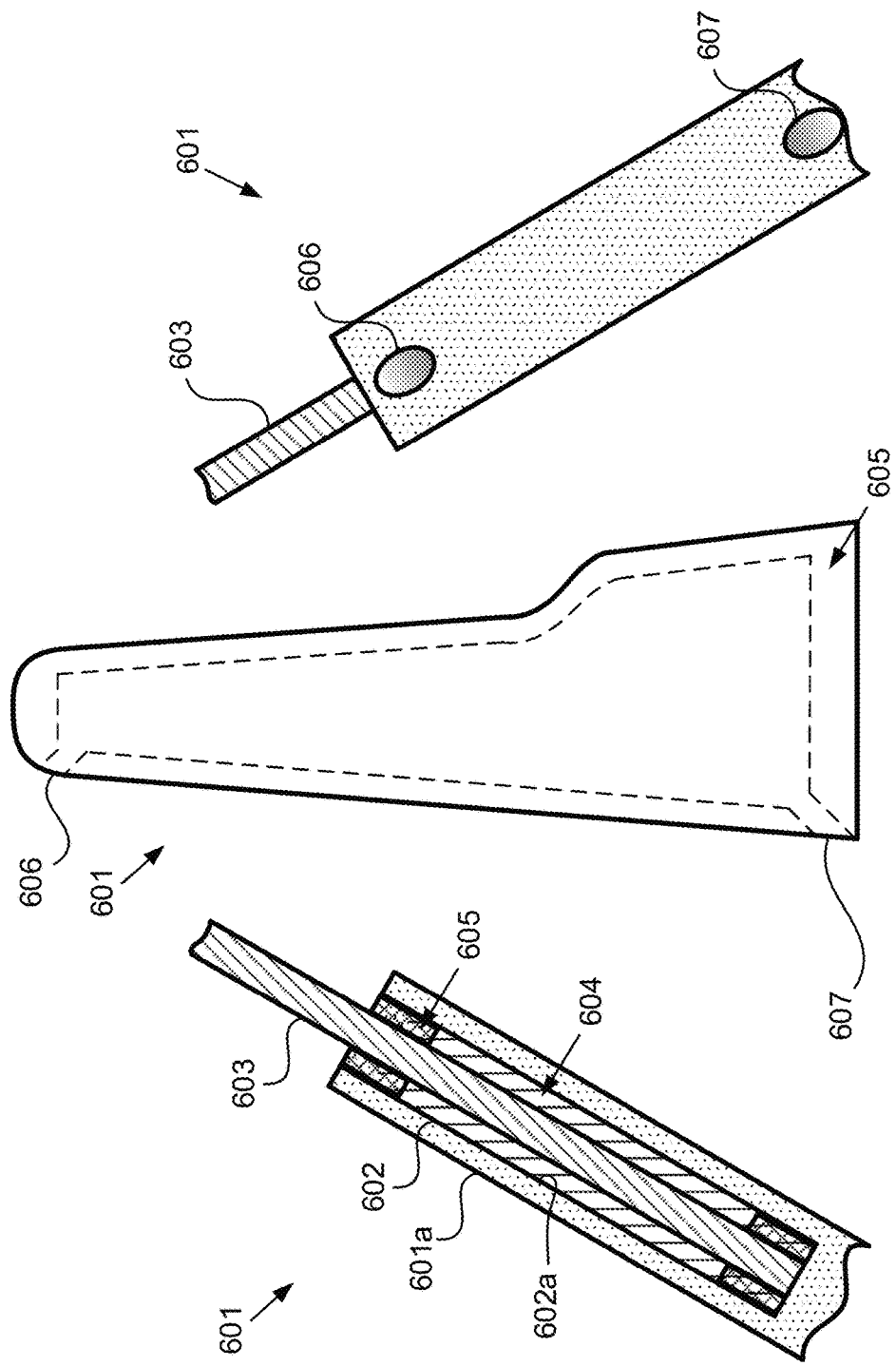

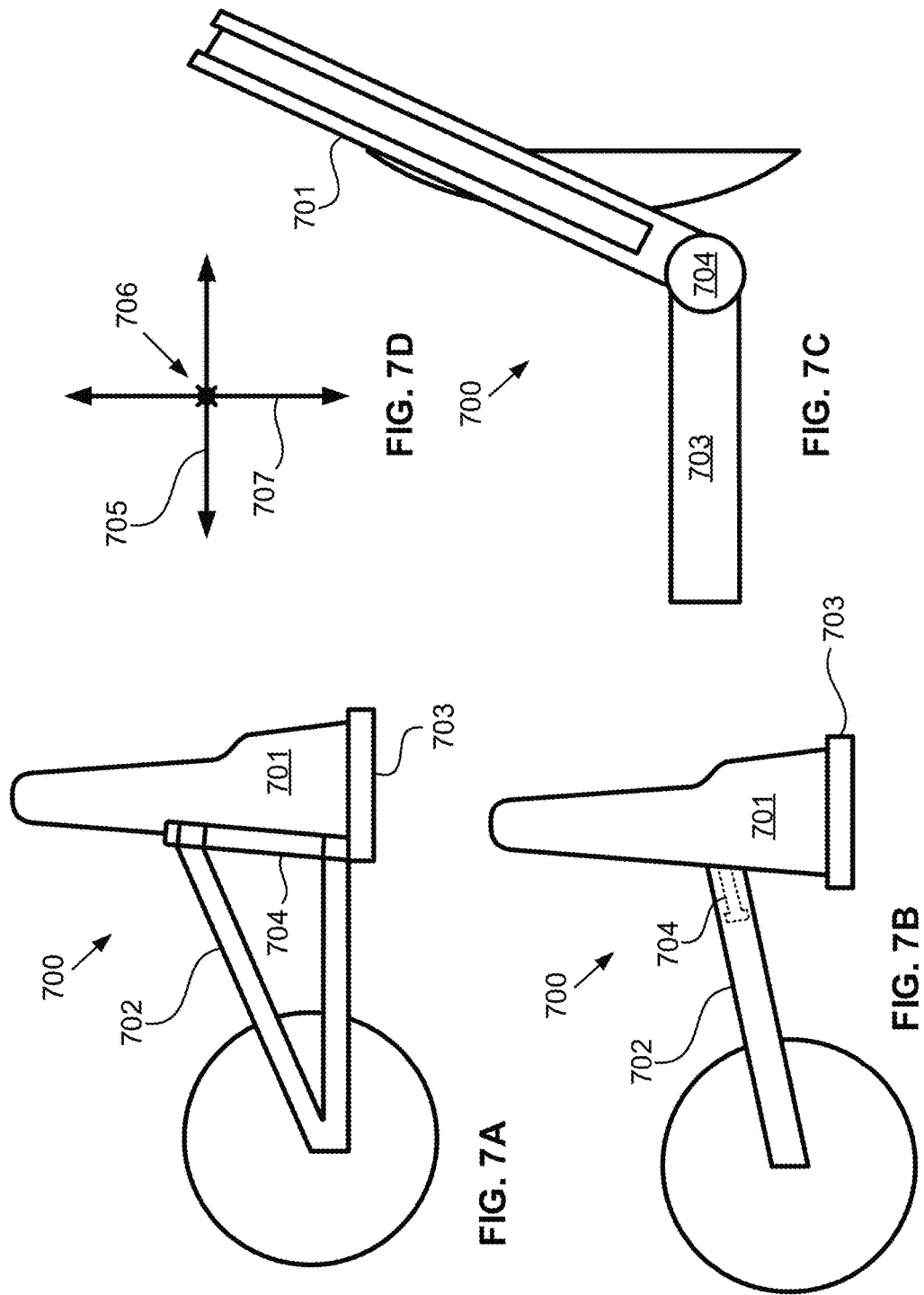

TRIPARTITE SUPPORT MECHANISM FOR FRAME-MOUNTED VEHICLE COMPONENTS

TECHNICAL FIELD

This invention relates generally to vehicle frames, and more particularly mechanisms for mounting vehicle components to the vehicle frame.

BACKGROUND

The market for street legal recreational vehicles is exploding. Although traditionally motorcycles have dominated the street legal segment, three-wheeled roadsters have recently gained a foothold. Among three wheeled roadsters, Vanderhall Motor Works has set itself apart as a manufacturer of premium roadsters, bringing luxury, class, and classic style without sacrificing power or performance. Indeed, as the market for three wheeled roadsters becomes more competitive, solutions are needed that address consumers demand for better handling and speed while still maintaining a sleek design. Thus, there is still significant room for improvement to designs for three wheeled roadsters.

SUMMARY OF THE INVENTION

A tripartite vehicle component support mechanism is described herein that addresses some of the issues discussed above. In general, the claimed invention, which is described herein regarding various embodiments, includes a monolithic component that provides support for a vehicle windshield, a side view mirror, and a vehicle body panel. The support mechanism addresses some of the issues discussed above by reducing the weight of the vehicle and lowering its center of gravity. Alone or in conjunction with other weight-reducing solutions, the support mechanism helps increase the vehicle's speed and agility without sacrificing functionality.

In one embodiment of the claimed invention, a vehicle is described that includes a unibody vehicle frame, a vehicle body panel, a windshield having one or more exposed edges, and one or more monolithic tripartite support mechanisms, which mechanisms provide structural support for at least three frame-mounted vehicle components. Each support mechanism includes a windshield support arm, a side view mirror support arm, and a body panel fixing plate. The windshield support arm is coupled to the windshield along at least one edge of the windshield, leaving a portion of that edge unexposed. The side view mirror support arm extends from the windshield support, and the body panel fixing plate extends from the windshield support arm, the side-view mirror support arm, or both. Additionally, the windshield support arm holds a windshield to the vehicle, the side view mirror support arm holds a side view mirror to the vehicle, and the fixing plate secures the body panel to the frame.

In another embodiment of the claimed invention, a vehicle is described that includes a unibody vehicle frame, a vehicle body panel, a windshield having one or more exposed edges, and one or more integrated, tripartite support mechanisms, which mechanisms provide structural support for at least three frame-mounted vehicle components. While not monolithic, the various structures of the support mechanism are integrated into a single part. Each support mechanism includes a windshield support arm, a side view mirror support arm, a body panel fixing plate, and one or more pivot joints. The windshield support arm is coupled to the windshield along at least one edge of the windshield, leaving a portion of that edge unexposed. The side view mirror support arm is coupled directly to and extends from the windshield support arm. The body panel fixing plate is coupled directly to, and extends from, the windshield support arm, the side view mirror support arm, or both, and secures the body panel to the frame. The pivot joints are disposed between, and couple together, the windshield support arm and the side view mirror support arm, the windshield support arm and the fixing plate, the side view mirror support arm and the fixing plate, or combinations thereof.

In yet another embodiment of the claimed invention, a vehicle is described that includes a unibody frame, a vehicle body panel, a right-side windshield, a left-side windshield independent of the right-side windshield, and one or more monolithic, tripartite support mechanisms, which mechanisms provide structural support for at least three frame-mounted vehicle components. The right- and left-side windshields each have one or more exposed edges. Each support mechanism includes a right-side windshield support arm, a left-side windshield support arm, and a body panel fixing plate. The right-side and left-side windshield support arms are disposed between right-side and left-side vehicle windshields, and are coupled to the respective windshield along at least one edge of the respective windshield, leaving at least a portion of the edge of the respective windshield unexposed. The body panel fixing plate extends from the right-side windshield support arm, the left-side windshield support arm, or both, and secures the body panel to the frame.

BRIEF DESCRIPTION OF THE DRAWINGS

A more particular description of the invention briefly described above is made below by reference to specific embodiments. Several embodiments are depicted in drawings included with this application, in which:

FIGS. 1A-C depict various views of an embodiment of a vehicle according to the claimed invention;

FIGS. 4A-B depict two views of a mechanism for securing a tripartite vehicle component support mechanism to a vehicle frame;

FIGS. 5A-B depict two views of a tripartite vehicle component support mechanism that fixedly couples to a vehicle frame;

FIGS. 6A-C depict three views of a windshield support arm that holds a windshield by a chemical adhesive;

FIGS. 7A-D depict various embodiments of an articulating, tripartite vehicle component support mechanism according to the claimed invention;

DETAILED DESCRIPTION

A detailed description of the claimed invention is provided below by example, with reference to embodiments in the appended figures. Those of skill in the art will recognize that the components of the invention as described by example in the figures below could be arranged and designed in a wide variety of different configurations. Thus, the detailed description of the embodiments in the figures is merely representative of embodiments of the invention, and is not intended to limit the scope of the invention as claimed.

The descriptions of the various embodiments include, in some cases, references to elements described with regard to other embodiments. Such references are provided for convenience to the reader, and to provide efficient description and enablement of each embodiment, and are not intended to limit the elements incorporated from other embodiments to only the features described with regard to the other embodiments. Rather, each embodiment is distinct from each other embodiment. Despite this, the described embodiments do not form an exhaustive list of all potential embodiments of the claimed invention; various combinations of the described embodiments are also envisioned, and are inherent from the descriptions of the embodiments below. Additionally, embodiments not described below that meet the limitations of the claimed invention are also envisioned, as is recognized by those of skill in the art.

In some instances, features represented by numerical values, such as dimensions, quantities, and other properties that can be represented numerically, are stated as approximations. Unless otherwise stated, an approximate value means "correct to within 50% of the stated value." Thus, a length of approximately 1 inch should be read "1 inch +/−0.5 inch." Similarly, other values not presented as approximations have tolerances around the stated values understood by those skilled in the art. For example, a range of 1-10 should be read "1 to 10 with standard tolerances below 1 and above 10 known and/or understood in the art."

Figure 1A:
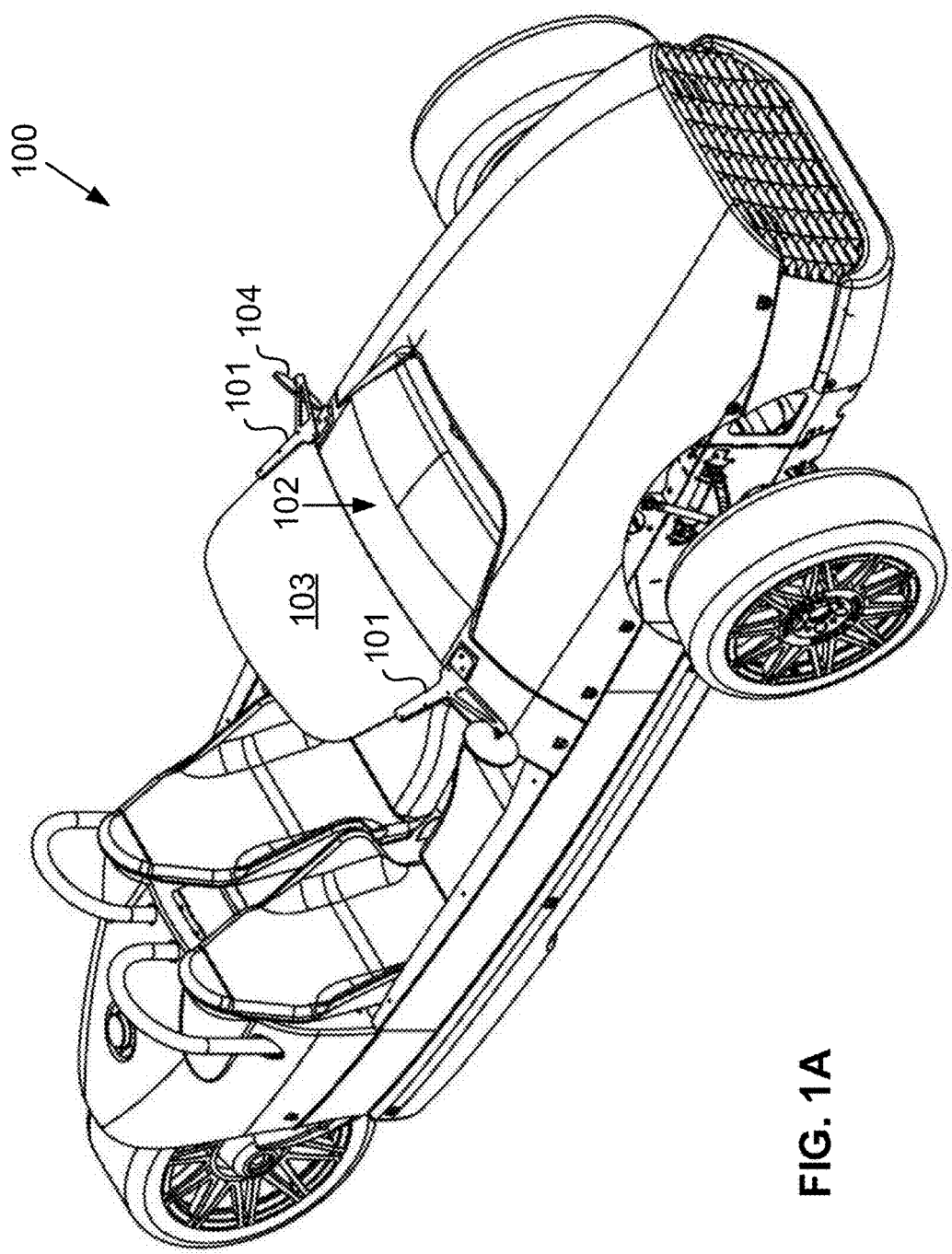

FIGS. 1A-C depict various views of an embodiment of a vehicle according to the claimed invention. As shown in FIG. 1A, vehicle 100 includes tripartite vehicle complement support mechanism 101, body panel 102, windshield 103, and side view mirror 104. FIG. 1B depicts unibody vehicle frame 105. Frame 105 is one example of a unibody frame that forms the chassis of vehicle 100. As shown in greater detail in FIG. 1C, support mechanism 101 secures windshield 103, body panel 102, and side view mirror 104 to frame 105.

Though vehicle 100 is depicted as a particular model of a three-wheeled vehicle, in various other embodiments of the claimed invention vehicle 100 includes a variety of different wheeled vehicles. For example, in some embodiments, vehicle 100 includes two front wheels and one rear wheel, whereas in other embodiments vehicle 101 includes one front wheel and two rear wheels. In some embodiments, vehicle 100 is a two wheeled vehicle, such as a motorcycle. In other embodiments, vehicle 100 is a four wheeled vehicle. Furthermore, various other embodiments of the claimed invention include watercraft and/or aircraft. Additionally, in many embodiments, vehicle 100 includes a motor powerful enough to drive the vehicle at a high rate of speed, in some embodiments exceeding 100 miles per hour.

Support mechanism 101 includes windshield support arm 101a, side view mirror support arm 101b, and body panel fixing plate 101c. In the depicted embodiment, support arm 101b and fixing plate 101c extend from support arm 101a. However, in various other embodiments, fixing plate 101c extends from support arm 101b or both support arms 101a and 101b. Support arm 101a holds windshield 103 to frame 105; support arm 101b holds side-view mirror 104 to frame 105; and fixing plate 101c secures body panel 102 to frame 105.

Support mechanism 101 provides a number of benefits when incorporated with vehicle 100. First, windshield support arm 101a eliminates the need for heavy and expensive frame elements to support windshield 103. Especially at high rates of speed, a durable windshield is necessary to protect the driver from road debris, among other things. Typically, heavy windshields require heavy support structures. However, support mechanism 101 allows for a similarly durable windshield to be used without needing the extra weight from, for example, an integrated windshield support frame. Additionally, support mechanism 101 secures body panel 102 to frame 105. In vehicles where the windshield is mounted to the frame, additional structure is also needed to mount body panels around the windshield to the frame. However, support mechanism 101 eliminates the need for the extra body panel support structure, further reducing the weight of vehicle 100 relative to other vehicles requiring additional body panel support structure.

In the depicted embodiment, body panel 102 forms part of vehicle 100's engine compartment and dashboard. However, body panel 102 also includes various other body panels, such as a fender, or part of the engine compartment hood. Body panel 102 is similarly composed of any of a variety of materials and/or combinations of materials in various embodiments, including carbon fiber, molded plastic, and/or aluminum, among others.

Figure 9:
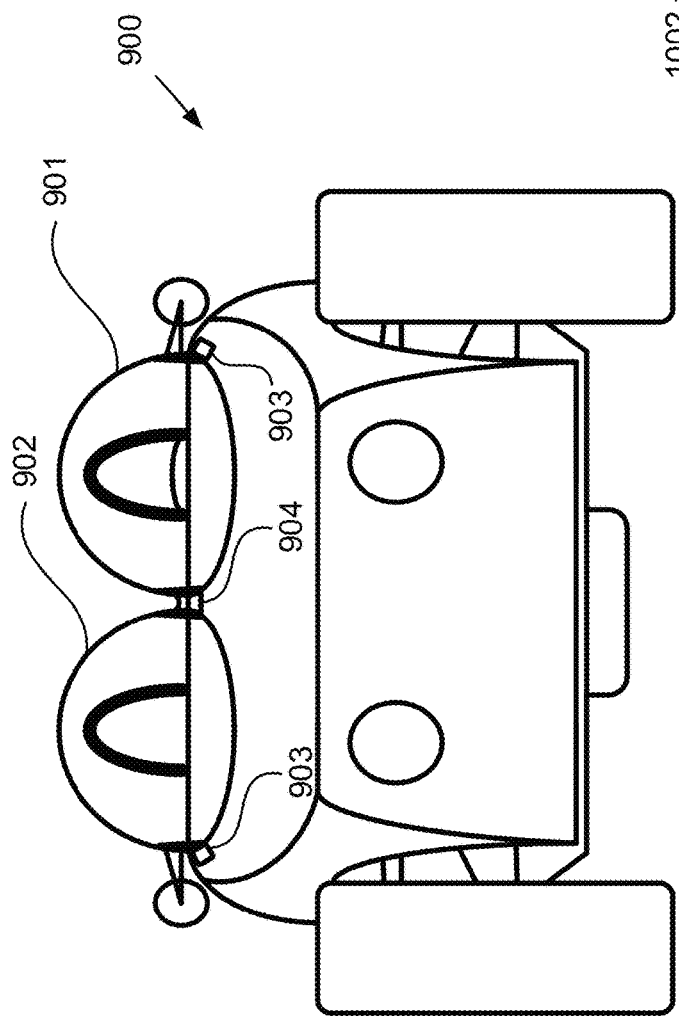
FIG. 9 depicts an embodiment of a vehicle according to the claimed invention having an alternative windshield configuration.

Windshield 103 includes a variety of shapes and materials. In the depicted embodiment, windshield 103 is convex and trapezoidal, with rounded corners. However, other shapes are also envisioned, one example of which is depicted in FIG. 9. Additionally, as described above, in many embodiments, windshield 103 includes commonly used, durable shatter-proof glass. However, in other embodiments, windshield 103 includes any of a variety of transparent thermoplastics, such as poly(methyl methacrylate), commonly known as plexiglass. In the depicted embodiment, windshield 103 is mounted to frame 105 by a right-side support apparatus 101 and a left-side support apparatus 101.

Side-view mirror 104 is coupled to vehicle 100 by support arm 101b. While depicted as a round mirror, mirror 104 includes any of a variety of shapes and designs commonly known in the art.

Frame 105 includes any of a variety of unibody constructions. In some embodiments, such as the depicted embodiment, frame 105 is constructed to be configurable for windshield-to-frame design or support-structure-to-frame design. Thus, at the frame manufacturing stage, frame 105 includes windshield-to-frame support arms 105a. However, at the body-panel and windshield mounting stage, support arms 105a are sheared off, such as by a laser cutter, and frame 105 is modified at, for example, positions 105b,c such that support mechanism 101 can be mounted to frame 105. Body panel 102 is then placed over frame 105 and is secured at positions 105b,c to frame 105 by two support mechanisms 101. In some embodiments, windshield 103 is positioned in one support arm 101 before the second is introduced.

However, in other embodiments, windshield 103 is slid into grooves in windshield support arms 101a that fit around a bottom corner portion of the outside edge of windshield 103 after both support arms 101 are fixed over body panel 102 to frame 105. In some such embodiments, windshield 103 is secured to support mechanism 101 by, among other means, chemical adhesive and/or one or more bolts passing through windshield support arm 101a and windshield 103.

Figure 2:
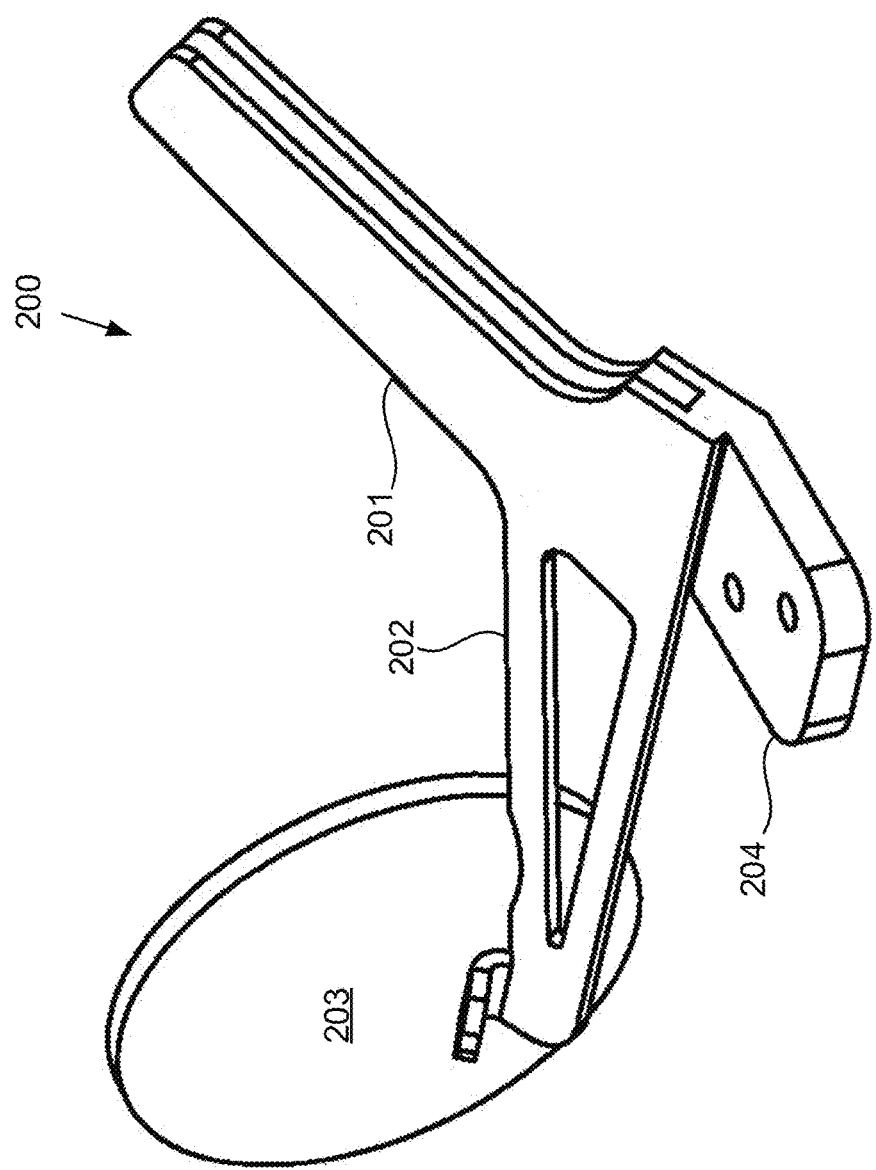
FIG. 2 depicts one embodiment of a tripartite vehicle component support mechanism according to the claimed invention.

FIG. 2 depicts one embodiment of a tripartite vehicle component support mechanism according to the claimed invention. Support mechanism 200, similar to support mechanism 101 described above, includes windshield support arm 201, side-view mirror support arm 202 supporting side-view mirror 203, and body panel fixing plate 204. In many embodiments, such as the one depicted, support mechanism 200 is monolithic (excluding side-view mirror 203), and is comprised of any of a variety of materials suitable for monolithic construction. For example, in some embodiments, support mechanism 200 is composed of cast and cut aluminum, steel, or other alloy. In other embodiments, support mechanism 200 is composed of compression-molded thermoplastic. In yet other embodiments, support mechanism 200 is 3D printed and reinforced with a hard-set resin.

In some embodiments, such as those described below regarding FIGS. 7-8B, support mechanism 200 includes separate but integrated parts. For example, in one embodiment, support arm 201 includes a front plate and a back plate, where the back plate is monolithic with fixing plate 204. In such embodiments, the windshield is sandwiched between the front and back plates of support arm 201, and the front and back plates and windshield are held together by, for example, one or more nut-and-bolt sets passing through each.

Figure 3A:
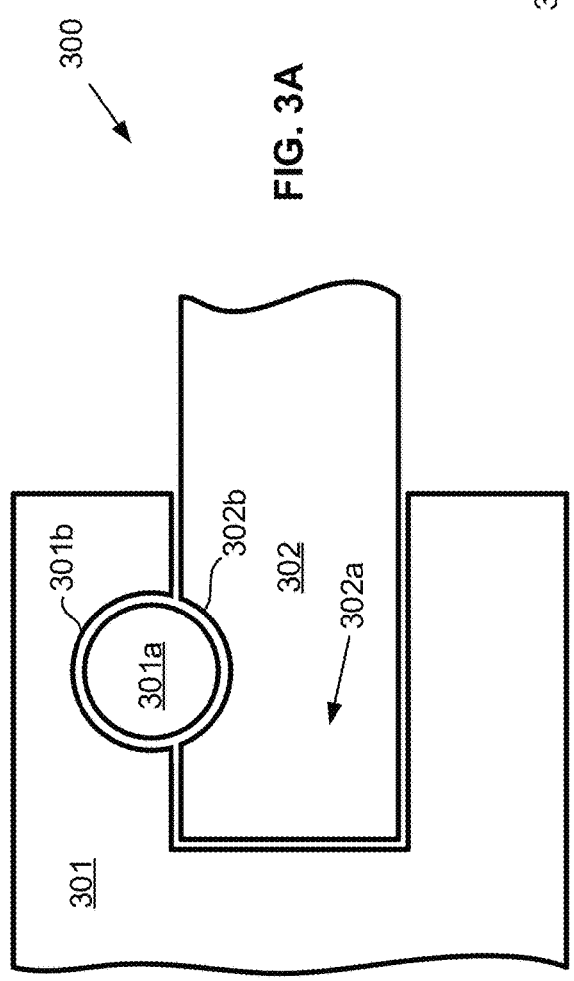
FIGS. 3A-B depict cross-sectional views of one embodiment of a tripartite vehicle component support mechanism and corresponding windshield according to the claimed invention.
Figure 3B:
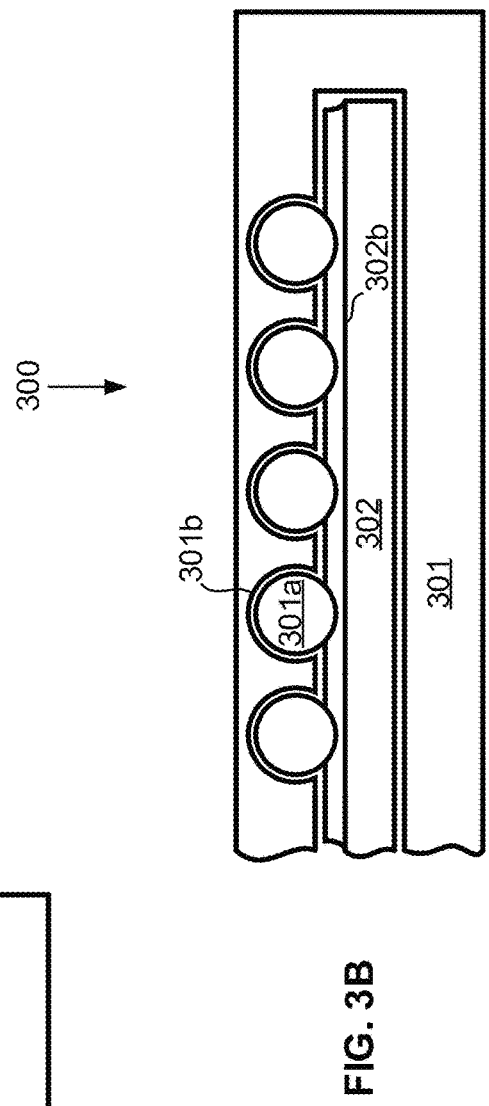

FIGS. 3A-B depict cross-sectional views of one embodiment of a tripartite vehicle component support mechanism and corresponding windshield according to the claimed invention. FIG. 3A is a bottom cross-sectional view of windshield support arm 301 and windshield 302, and FIG. 3B is a side cross-sectional view of the same. Support arm 301 wraps around windshield outside edge 302a at a depth ranging from ½-inch to 5 inches in various embodiments. Support arm 300 additionally includes bearings 301a rotatably disposed in pockets 301b in support arm 301. Windshield 302 includes groove 302b corresponding to, and aligned with, bearings 301a, where groove 302b is adjacent to outside edge 302a. As windshield 302 is inserted into support arm 301, bearings 301a align with groove 302b between support arm 301 and windshield 302.

Figure 8A:
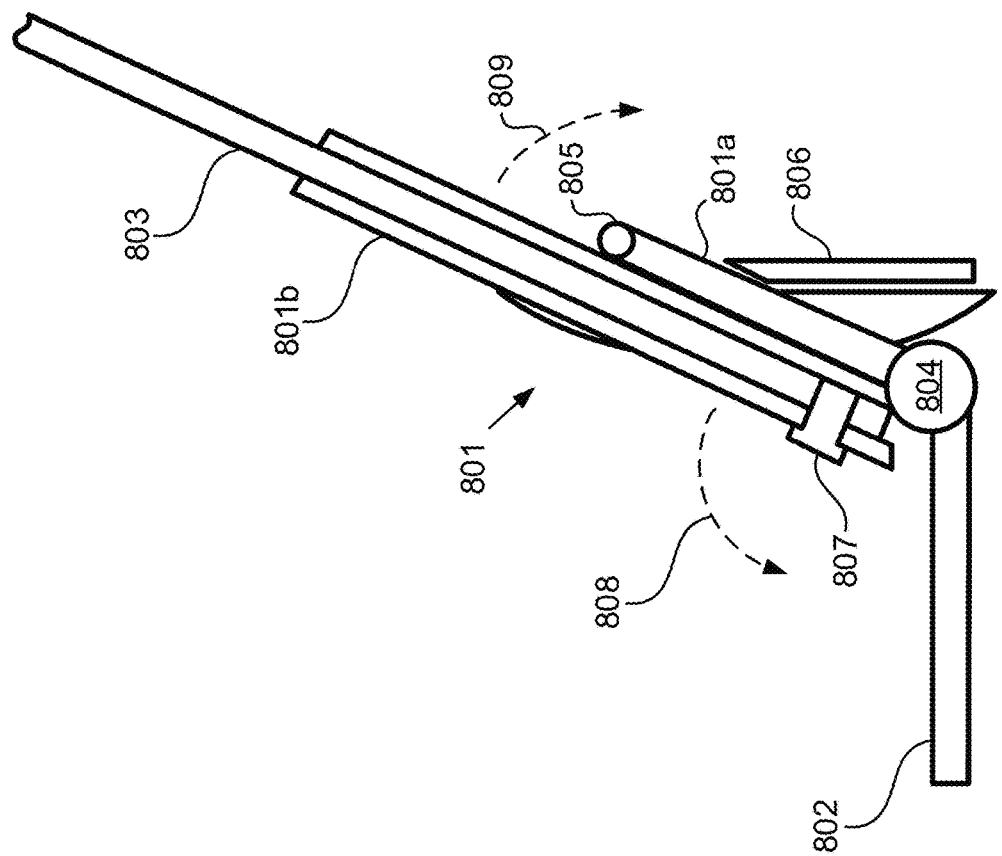
FIGS. 8A-B depict two views of an embodiment of an articulating, tripartite vehicle component support mechanism having two pivot joints that allow a windshield to be laid down on a hood of a corresponding vehicle.
Figure 8B:
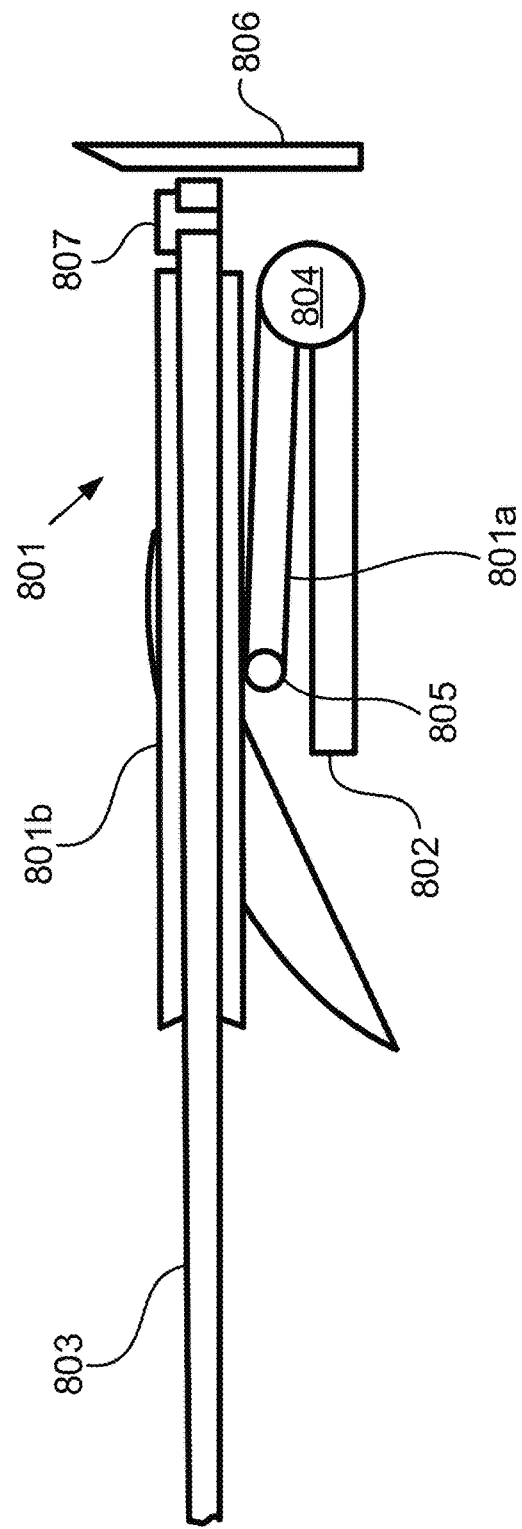

In some embodiments of the claimed invention, the windshield is slidably coupled to the vehicle frame in the support mechanism (one such example is depicted in FIGS. 8A-B). In various of these embodiments, bearings 301a are included that make it easier to transition the windshield, such as windshield 302, from lowered and slid over the hood to raised and secured. Bearings 301 are comprised of materials that reduce the risk of damage to windshield 302. Some such materials include hardened, thermoset plastic and Teflon. In some embodiments, a lubricant is disposed in pocket 301b.

FIGS. 4A-B depict two views of a mechanism for securing a tripartite vehicle component support mechanism to a vehicle frame. In some embodiments of the claimed invention, the support mechanism is removably coupled to the frame via the fixing plate. One benefit of this configuration is that a current support mechanism can be replaced with a new support mechanism having a different design and/or style. Not only does this allow for simple design interchangeability at the manufacturing and/or purchasing phase, but it also allows a vehicle owner to modify the look of the vehicle on the fly. For example, in some embodiments, the support mechanism includes various ornamental designs, such as a holiday design, or a design corresponding to a sports team. In some cases, a user interchanges the support mechanisms to correspond to an upcoming holiday or event. This is unique in several ways. First, current structural components of vehicles are not interchangeable, and thus it is impractical to incorporate designs such as seasonal and/or holiday designs. The claimed support mechanism overcomes this limitation with simple interchangeability. Second, many external vehicle decorations are either permanent, such as stickers that cannot be removed without ruining the sticker, or are clearly impermanent, such as vehicle magnets. The claimed support mechanism overcomes this limitation by being easily interchangeable while still giving the impression of full integration with the vehicle.

In the depicted embodiment, quick-release pin 401 removably couples fixing plate 402 (and thereby the corresponding support mechanism and windshield) and body panel 403 to frame 404. Pin 401 includes push-button 401a, spring-loaded locking wings 401b, wing spring 401c, forcing member 401d, push-button spring 401e, and flange 401f. Push-button spring 401e is a compression spring, and exerts an upward force on push-button 401a and forcing member 401d. As forcing member 401d is forced upwards, wings 401b are forced outwards from pin 401. Wing spring 401c is an extension spring. Wing spring is coupled to each wing 401b through pin 401, and draws wings 401b inwards towards each other. However, the force exerted by wing spring 401c on wings 401b is less than the force exerted by forcing member 401d outwards on wings 401b. Thus, in a static state where a downward force is not placed on push-button 401a, wings 401b are forced outwards from pin 401. As shown in FIG. 4A, in this static state, pin 401 secures fixing plate 402, body panel 403, and frame 404 between wings 401b and flange 401f. However, as shown in FIG. 4B, as push-button 401a is forced down, forcing member 401d is displaced from wings 401b and spring 401c draws wings 401b into pin 401, allowing pin 401 to be removed from fixing plate 402, body panel 403, and frame 404.

FIGS. 5A-B depict two views of a tripartite vehicle component support mechanism that that fixedly couples to a vehicle frame. FIG. 5A depicts a front view of support mechanism 501 supporting windshield 502 and side-view mirror 503. Support mechanism 501 includes fixing plate 501a having tab 501b that extends below fixing plate 501a. As shown in FIG. 5B, tab 501b extends into frame 504 in slot 504a, wherein tab 501b is welded to frame 504. A space is provided between fixing plate 501a and frame 504 to accommodate body panel 505.

The embodiment depicted in FIGS. 5A-B is beneficial in cases where windshield 502 must be fixedly secured to frame 504 where two body panels 505 meet, such as a dashboard and a firewall panel. In such embodiments, body panels 505 are secured to other portions of frame 504, in addition to the space between fixing plate 501a and frame 504. In some such embodiments, the space between fixing plate 501a and frame 504 is less than the thickness of body panels 505. When body panels 505 are inserted between fixing plate 501a and frame 504, they are compressed and pinned, thereby securing body panels 505 between fixing plate 501a and frame 504.

FIGS. 6A-C depict three views of a windshield support arm that holds a windshield by a chemical adhesive. Support arm 601 includes groove 602, within which windshield 603 is supported. Interior surface 602a of groove 602 is roughened to improve adherence of chemical adhesive 604 to interior surface 602a. Chemical adhesive 604 fills the space in groove 602 between interior surface 602a and windshield 603, adhering windshield 603 to support arm 601. Padding 605 is provided around the edges of groove 602 to dampen vibration of windshield 603, cushion windshield 603 from support arm 601, and contain adhesive 604 within groove 602.

As shown in FIGS. 6B-C, in some embodiments, support arm 601 includes fluid inlet 606 passing between outside surface 601a of support arm 601 and interior surface 602a. In such a configuration, as a fluid is injected into inlet 606, it is distributed between windshield 603 and interior surface 602a. For example, in some cases, adhesive 604 is injected into groove 602 through inlet 606. Then, inlet 606 is capped until windshield 603 is to be removed. To remove windshield 603, some of adhesive 604 is broken up, and a solvent is injected into groove 602 through inlet 606 that dissolves adhesive 604. In some embodiments, fluid outlet 607 is also included to help in removing the dissolved adhesive. Similar to inlet 606, outlet 607 passes between interior surface 602a and outside surface 601a. Additionally, outlet 607 is positioned and oriented to allow gravity to pass fluid from groove 602 through outlet 607 and out of support arm 601. For example, in some cases, instead of or in addition to injecting solvent through inlet 606, solvent is injected through outlet 607. Because outlet 607 is positioned beneath groove 602, gravity causes fluid to flow from groove 602 through outlet 607. Such fluid includes, in various cases, adhesive 604, solvent, or both.

FIGS. 7A-D depict various embodiments of an articulating, tripartite vehicle component support mechanism according to the claimed invention, where FIG. 7D depicts a set of reference axes for each of FIGS. 7A-C. In general, FIGS. 7A-C depict, in general, support mechanism 700, including windshield support arm 701, side-view mirror support arm 702, and body panel fixing plate 703, similar to those support arms described above. Support arm 700 is incorporated with a vehicle, mounting a windshield to the vehicle and securing a body panel to the vehicle frame, all similar to embodiments already described. Additionally, though, support mechanism 700 includes one or more pivot joints 704. As used herein, and unless otherwise stated, "pivot joint" refers to any of a variety of articulating joints, including a ball and socket joint, a condyloid joint, a saddle joint, a hinge joint, and a typical pivot joint. For example, as depicted in FIGS. 7A and C, pivot joint 704 is a hinge joint, whereas in FIG. 7B pivot joint 704 is a typical pivot joint.

In various embodiments, pivot joint 704 is disposed between, and couples, support arms 701 and 702, support arm 701 and fixing plate 703, support arm 702 and fixing plate 703, or combinations thereof. In some embodiments, one pivot joint 704 is disposed between support arms 701 and 702, and another pivot joint 704 is disposed between support arm 701 and fixing plate 703. Additionally, in various embodiments including pivot joint 704, support arm 701 and fixing plate 703 are monolithic, support arm 701 and support arm 702 are monolithic, or support arm 702 and fixing plate 703 are monolithic. For example, as depicted in FIG. 7A, pivot joint 704 is disposed between support arms 701 and 702, and support arm 701 and fixing plate 703 are monolithic.

Pivot joint 704, in the various embodiments of support mechanism 700 including pivot joint 704, rotates about one or more axes of rotation. Regarding FIG. 7D, horizontal axis 705 is oriented from a right side of a corresponding vehicle to a left side of the vehicle. Horizontal axis 706, which is depicted as an arrow's head and tail coming out of, and going in to, the page, is oriented from a front end of the vehicle to a back end of the vehicle. Vertical axis 707 is oriented from a bottom of the vehicle to a top of the vehicle. In FIG. 7A, pivot joint 704 has an axis of rotation oriented primarily along vertical axis 707, but also partially along axes 705 and 706, as well. In FIG. 7B, pivot joint has an axis of rotation oriented primarily along horizontal axis 705, but also partially along vertical axis 707. FIG. 7C, is a side view of support mechanism 700, and horizontal axis 705 goes into the page. In FIG. 7C, pivot joint 704 is oriented along horizontal axis 705.

FIGS. 8A-B depict two views of an embodiment of an articulating, tripartite vehicle component support mechanism having two pivot joints that allow a windshield to be laid down on a hood of a corresponding vehicle. The depictions include windshield support arm 801 having support portion 801a and windshield securing portion 801b, body panel fixing plate 802, windshield 803, pivot joints 804, 805, support bracket 806, and windshield locking tabs 807. Support portion 801a and bracket 806 provide structural support for windshield 803 when windshield 803 is up to block wind as the vehicle is operated. In some embodiments, support portion 801a is secured to bracket 806, such as by a lynchpin, to prevent support portion 801a from rotating about pivot joint 804. Additionally, bracket 806 helps prevent movement of windshield 803 when windshield 803 lays down on the hood. Windshield 803 is slidably mounted in windshield support arm 801 such that, as windshield support arm 801 folds down towards fixing plate 802 in the direction of arrow 808, windshield 803 slides over the vehicle hood. Tabs 807 secure windshield 803 to securing portion 801b when windshield 803 is up or down to prevent windshield 803 from sliding in securing portion 801b.

The components described above allow windshield 803 to be laid down on the vehicle hood. This is unique from previous solutions that allow the windshield to be laid down in several ways. For example, the dual pivot joint assembly allows windshield 803 to be laid down on the hood such that the convexity of windshield 803 is aligned with the convexity of the hood. This reduces stress on windshield 803 relative to solutions where the windshield is simply laid down.

Windshield 803 is laid down on the hood by unsecuring support portion 801a from bracket 806 and removing bottom tab 807. Support portion 801a is then rotated about pivot joint 804 in the direction of arrow 808 towards fixing plate 802, while securing portion 801b is rotated about pivot joint 805 in the direction of arrow 809. Windshield 803 is slid through securing portion 801b until top tab 807 buts against securing portion 801b. Though not depicted, some means, such as a clip extending from bracket 806, secures windshield 803 against the hood in the laid-down position.

FIG. 9 depicts an embodiment of a vehicle according to the claimed invention having an alternative windshield configuration. Vehicle 900 is similar to vehicle 100 described above, except vehicle 900 includes right-side windshield 901 and left-side windshield 902 that are separate components. Windshields 901 and 902 are, in the depicted embodiment, secured at the outside of vehicle 900 by support mechanisms 903, which are similar to those described above. However, other means of securing windshields 901 and 902 are also used in other embodiments. Additionally, windshields 901 and 902 are secured at the center of vehicle 900 by monolithic, tripartite vehicle component support mechanism 904, described below in more detail regarding FIG. 10.

Windshields 901 and 902 are half- to quarter-dome-shaped windshields, and provide several design and engineering benefits to vehicle 900. For example, the shape of windshields 901 and 902 reduces drag on vehicle 900. This similarly reduces the stress on windshields 901 and 902 relative to more flat and/or single-pane windshields.

Figure 10:
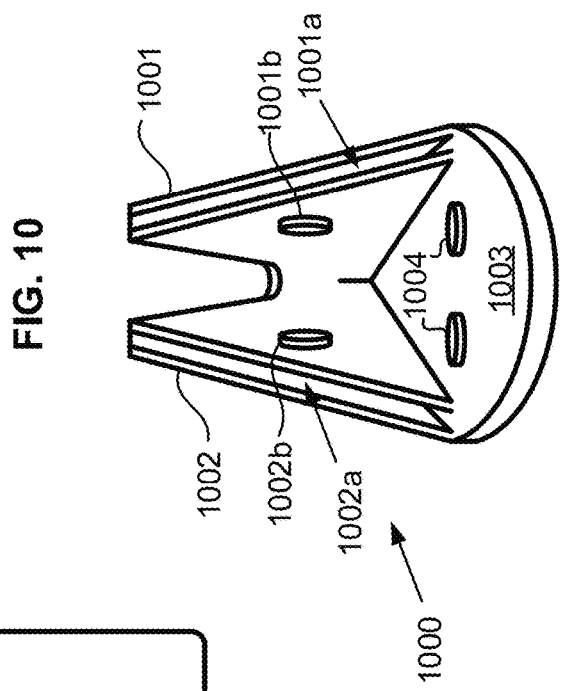
FIG. 10 depicts an embodiment of a monolithic, tripartite vehicle component support mechanism for use with a dual-domed windshield configuration, such as that depicted in FIG. 9.

FIG. 10 depicts an embodiment of a monolithic, tripartite vehicle component support mechanism for use with a dual-domed windshield configuration, such as that depicted in FIG. 9. Support mechanism 1000 includes right-side windshield support arm 1001, left-side windshield support arm 1002, and body panel fixing plate 1003. Support arms 1001 and 1002 are disposed between, and provide support for, right-side and left-side vehicle windshields. Fixing plate 1003 extends from support arm 1001, 1002, or both, and secures a vehicle body panel to a unibody frame of the vehicle. As shown, support mechanism 1000 is monolithic. However, similar to other embodiments described above, in some embodiments, support mechanism is multi-faceted and/or includes pivoting joints. Also as shown, support arms 1001 and 1002 include grooves 1001a and 1002a, respectively, that fit around at least a portion of an outside edge of corresponding windshields. The windshields are secured in grooves 1001a and 1002a by securing pins 1001b and 1002b. However, in some embodiments, the windshields are secured in grooves 1001a and 1002a by a chemical adhesive, similar to that already described.

Support mechanism 1000 is similar in many respects to the other support mechanisms already described. For example, in some embodiments, fixing plate is removably coupled to the frame, such as by bolts 1004, or by the quick-release pin described regarding FIG. 4. Conversely, in some embodiments, support mechanism 1000 is fixedly coupled to the frame, similar to support mechanism 501 described regarding FIG. 5.

We claim:

1. A vehicle, comprising:
   a unibody vehicle frame;
   a vehicle body panel;
   a windshield having one or more exposed edges;
   one or more monolithic, tripartite support mechanisms, each of which provide support to at least three frame-mounted vehicle components, and each support mechanism comprising:
   a windshield support arm coupled to the windshield along at least one edge of the windshield;
   a side-view mirror support arm extending from the windshield support arm; and
   a body panel fixing plate extending from the windshield support arm, the side-view mirror support arm, or both, wherein the fixing plate secures the body panel to the frame.

2. The vehicle of claim 1, wherein the windshield is mounted to the frame by a right-side monolithic, tripartite support mechanism and a left-side monolithic, tripartite support mechanism.

3. The vehicle of claim 1, further comprising a windshield, wherein the windshield support arm comprises a groove that fits around at least a portion of an outside edge of the windshield.

4. The vehicle of claim 3, the windshield comprising a groove adjacent to the outside edge of the windshield, and the windshield support arm further comprising one or more bearings aligned with the groove between the windshield support arm and the windshield.

5. The vehicle of claim 1, wherein the support mechanism is removably coupled to the frame.

6. The vehicle of claim 5, wherein a push-button quick-release apparatus removably couples the support mechanism to the vehicle frame.

7. The vehicle of claim 5, the fixing plate fixedly coupled to the frame, wherein the fixing plate comprises a tab and the frame comprises a slot corresponding to the fixing plate tab, wherein the tab extends into the slot and is welded to the frame.

8. The vehicle of claim 1, the windshield support arm further comprising:
   a groove having a roughened interior surface;
   a fluid inlet passing between an outside surface of the windshield support arm and the interior surface of the groove, wherein injecting adhesive, solvent, or a combination of adhesive and solvent through the fluid inlet distributes the adhesive, solvent, or combination between the windshield and the roughened interior surface.

9. The vehicle of claim 8, the windshield support arm further comprising a fluid outlet passing between the interior surface of the groove and the outside surface of the windshield support arm, wherein gravity passes adhesive, solvent, or both, away from the windshield through the fluid outlet.

10. A vehicle, comprising:
    a unibody vehicle frame;
    a vehicle body panel;
    a windshield having one or more exposed edges;
    one or more integrated, tripartite support mechanisms, each of which provide support to at least three frame-mounted vehicle components, and each support mechanism comprising:
    a windshield support arm coupled to the windshield along at least one edge of the windshield;
    a side-view mirror support arm coupled directly to, and extending from, the windshield support arm;
    a body panel fixing plate coupled directly to, and extending from, the windshield support arm, the side-view mirror support arm, or both, wherein the fixing plate secures the body panel to the frame; and
    one or more pivot joints disposed between, and coupling, the windshield support arm and the side-view mirror support arm, the windshield support arm and the fixing plate, the side-view mirror support arm and the fixing plate, or combinations thereof.

11. The vehicle of claim 10, wherein the windshield support arm and the fixing plate are monolithic, the windshield support arm and the side-view mirror support arm are monolithic, or the side-view mirror support arm and the fixing plate are monolithic.

12. The vehicle of claim 10, wherein at least one of the one or more pivot joints has a vertical axis of rotation, a horizontal axis of rotation, or a combination of both, the horizontal axis of rotation oriented from a right side of the vehicle to a left side of the vehicle, from a front end of the vehicle to a back end of the vehicle, or a combination of both.

13. The vehicle of claim 10, comprising at least one pivot joint disposed between, and coupling, the windshield support arm and the fixing plate, and wherein the windshield support arm comprises a hinge between a support portion of the windshield support arm and a windshield securing portion of the windshield support arm, wherein as the support portion rotates about the at least one pivot joint towards the fixing plate, the windshield securing portion rotates about the hinge towards the support portion.

14. The vehicle of claim 10, wherein the windshield is slidably mounted in the windshield support arm such that, as the windshield support arm folds down towards the fixing plate, the windshield slides over a vehicle hood.

15. The vehicle of claim 10, wherein the fixing plate is removably coupled to the frame.

16. A vehicle, comprising:
a unibody vehicle frame;
a vehicle body panel;
a right-side windshield having one or more exposed edges;
a left-side windshield independent of the right-side windshield and having one or more exposed edges;
one or more monolithic, tripartite support mechanisms, each of which provide support to at least three frame-mounted vehicle components, and each support mechanism comprising:
a right-side windshield support arm coupled to the right-side windshield along at least one edge of the right-side windshield;
a left-side windshield support arm coupled to the left-side windshield along at least one edge of the left-side windshield,
wherein the right-side and left-side windshield support arms are disposed between the right-side and left-side windshields; and
a body panel fixing plate extending from the right-side windshield support arm, the left-side windshield support arm, or both, wherein the fixing plate secures the body panel to the frame.

17. The vehicle of claim 16, wherein the right-, left-, or right- and left-side windshield support arms comprise a groove that fits around at least a portion of the edge of the corresponding windshield.

18. The vehicle of claim 16, wherein the support mechanism is removably coupled to the frame.

19. The vehicle of claim 18, wherein a push-button quick-release pin removably couples the support mechanism to the vehicle frame.

20. The vehicle of claim 18, the support mechanism fixedly coupled to the frame, wherein the fixing plate comprises a tab and the frame comprises a slot corresponding to the fixing plate tab, wherein the tab extends into the slot and is welded to the frame.

\* \* \* \* \*